May 31, 1960 W. H. COOK, JR 2,938,335
NOISE SUPPRESSOR AND THRUST REVERSER
Filed April 14, 1958 3 Sheets-Sheet 1
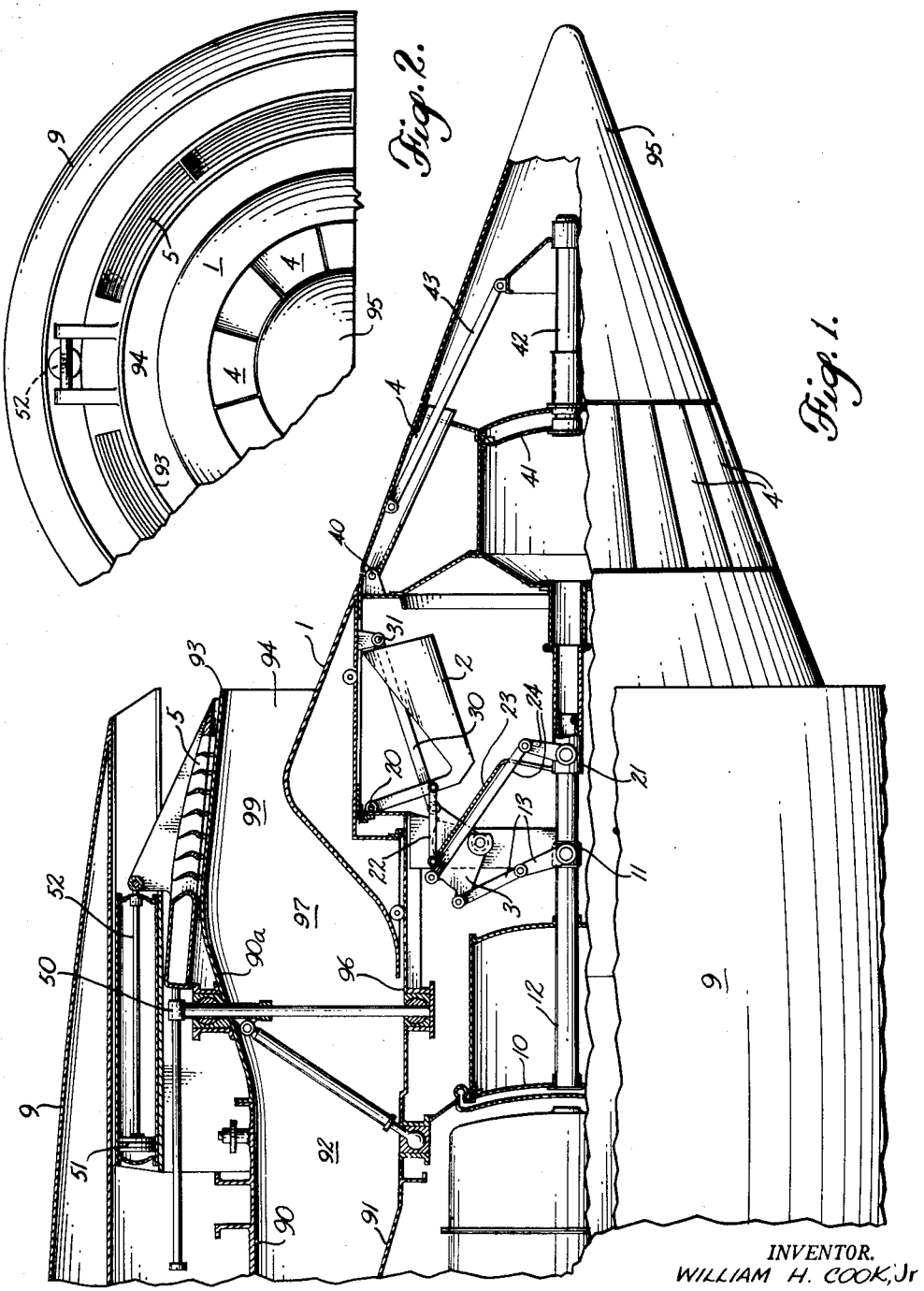
INVENTOR.
WILLIAM H. COOK, Jr
BY
Reynolds, Beach & Christensen
ATTORNEYS

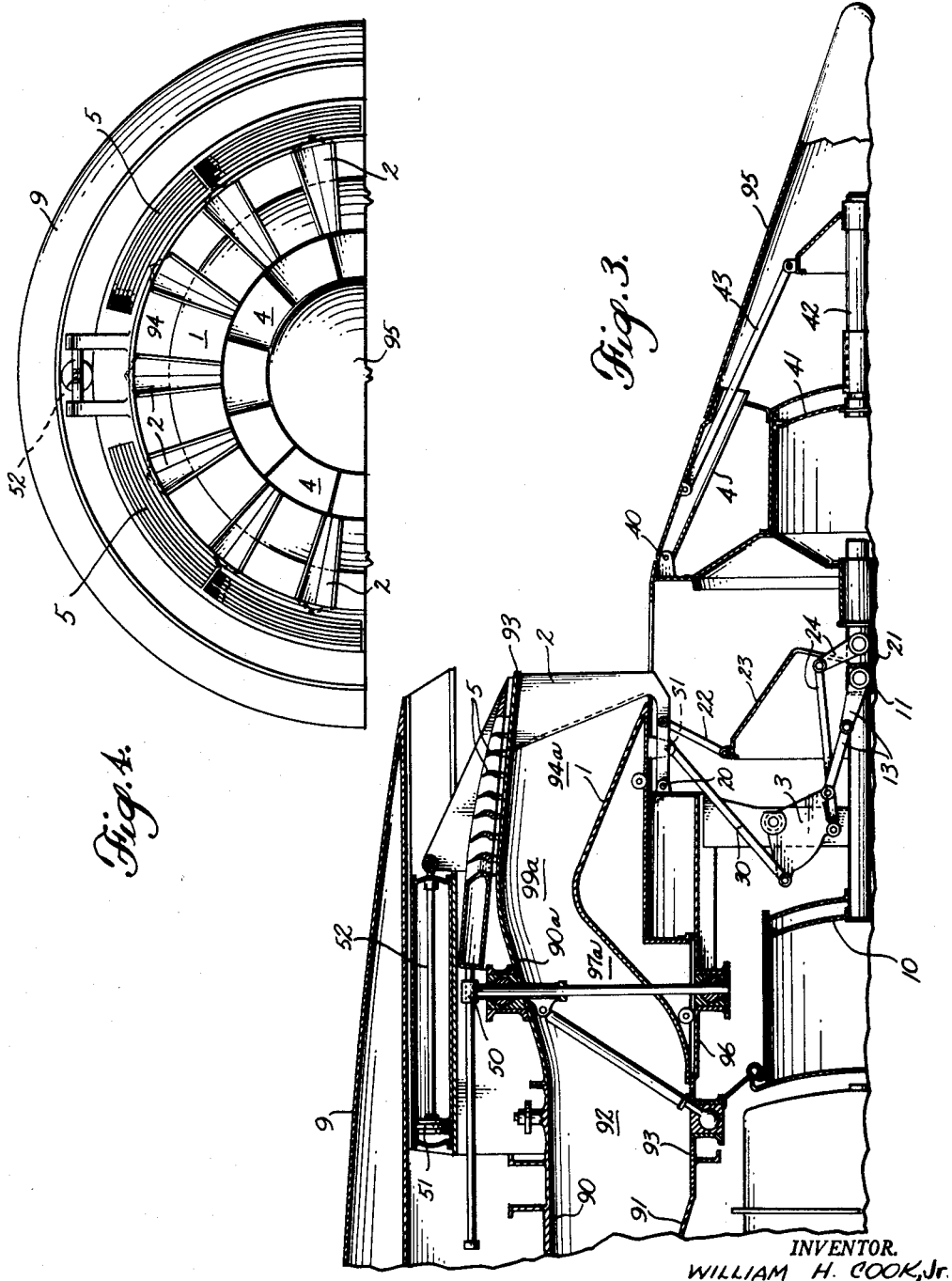

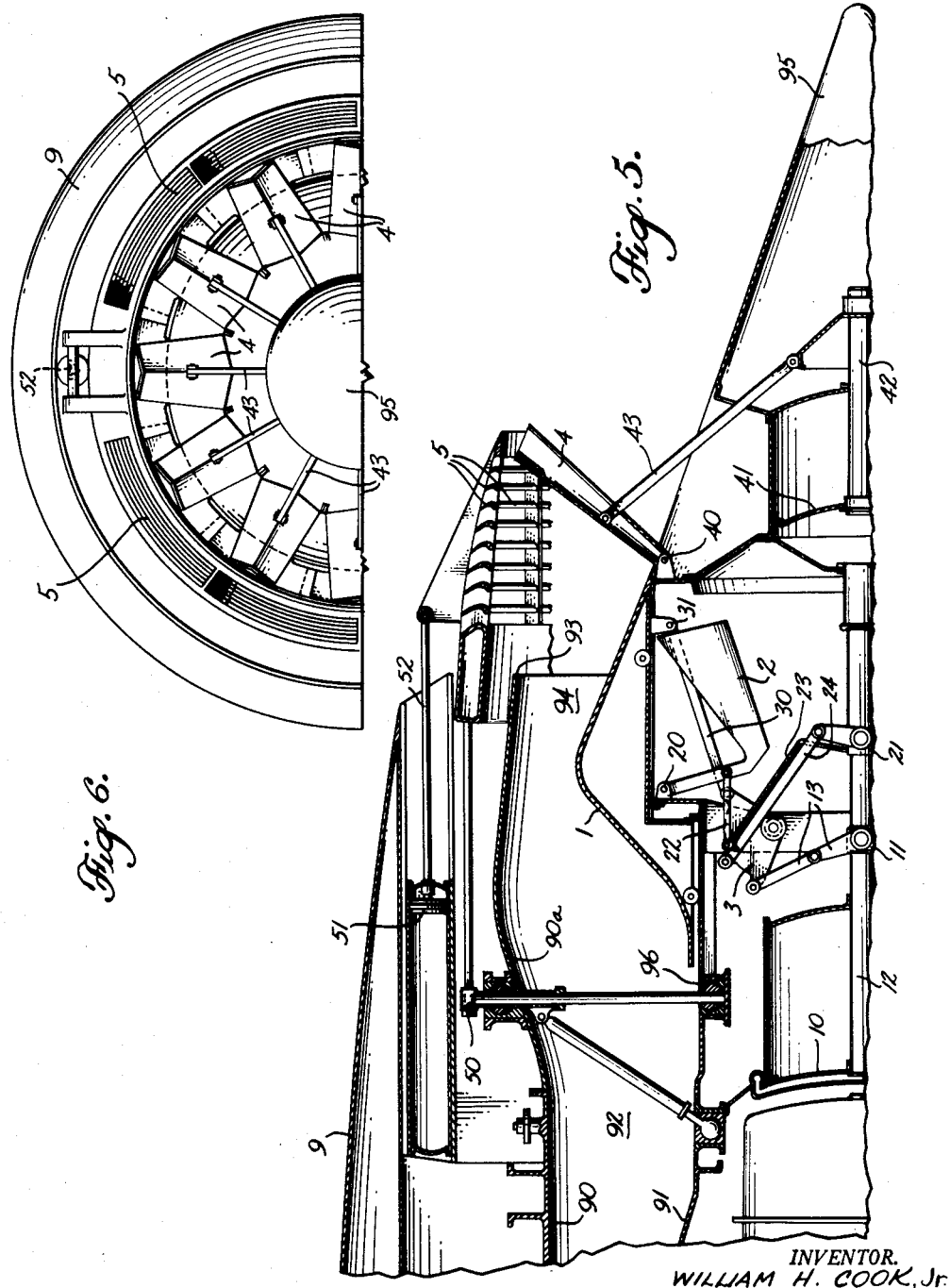

United States Patent Office 2,938,335
Patented May 31, 1960

2,938,335

NOISE SUPPRESSOR AND THRUST REVERSER

William H. Cook, Jr., Bellevue, Wash., assignor to Boeing Airplane Company, Seattle, Wash., a corporation of Delaware Filed Apr. 14, 1958, Ser. No. 728,182

9 Claims. (Cl. 60—35.54)

This invention deals with noise suppression devices for the tailpipe of engines of the type which are commonly called jet engines, used for the propulsion of aircraft, and combines with the noise suppression devices other devices for reversal of thrust after touchdown. In general, the principles of this invention, and its objectives, parallel those disclosed in the co-pending and commonly owned application of Grotz, Reinhart and Swanke, Serial No. 634,106, filed January 14, 1957, but achieve like results by different mechanisms and operations. The application of Lawler and Reinhart, Serial No. 679,265, filed August 20, 1957, also involves similar principles, but it too employs different mechanisms and relationships.

The reversal of thrust is ultimately achieved, in this construction, in a manner and by means analogous to those in the applications just referred to, which are per se known in the art, although assisted by special intercepting elements peculiar to this invention. The suppression of noise, and in particular the manner of adjusting the exit nozzle area to compensate for the restriction produced by jet stream dividers such as are needed for noise suppression, is accomplished in a different manner in this invention. Whereas in the Grotz et al. application referred to above such compensation was achieved by enlargement, and restoration by contraction, of a leaved extension ring located exteriorly of the annular jet nozzle, at its terminus, herein the rear terminus of the nozzle, at its exterior, is complete, integral, and unvarying in size and position, and compensation is accomplished by adjustment in the axial direction of a bulbous plug member which cooperates with the interior conformation of the unchanging rear nozzle terminus to form a convergent-divergent annular exit, of known type, and of known characteristics and advantages, under all conditions. By leaving the nozzle's rear terminus unbroken, externally as well as internally, the whole construction is simpler, less susceptible to forces acting upon it from the jet stream or from the relative air stream, and has no small movable parts or leaves that could fail in operation. Further differences from the construction of the application referred to reside in the divorcement of jet dividers, used for silencing, from physical connection to or support upon the nozzle area enlarging means, although they still move cooperatively between cruise position and noise suppressing position, and in the provision of positively acting thrust-intercepting or reversing vanes such as will block substantial rearward exit of the gases, and direct them instead outwardly by way of the known reversing louvers preferably employed, which at such time are in operative position to direct them forwardly.

The Lawler et al. application more nearly resembles this invention in that it employs an axially shiftable plug or bulbous sleeve, but the arrangement herein for reversal of thrust, in particular, differs materially from those for that purpose in Lawler et al.

More specifically, and by way of example, the engine terminates at its rear end in an annular gas passage the outer wall whereof, defining the tailpipe, flares outwardly and then inwardly; cooperating therewith is an island structure terminating in a tailcone, and a bulbous sleeve movable axially with relation to the island and tailcone, and especially with relation to the change in curvature of the outer wall mentioned from outwardly flaring to inwardly flaring, whereby to enlarge or to decrease the area of the throat between such change of curvature and the maximum bulb diameter, while still, in all positions, maintaining the convergent-divergent character of the gas passage just preceding discharge to the atmosphere. This convergent-divergent shape produces maximum performance, as the art recognizes. Coincident with enlargement of the throat, and conveniently although not necessarily by the same actuating means, stream divider vanes may be moved transversely across the issuing jet, dividing it into small individual jets of approximately the same aggregate area as the initial annular jet, by reason of the enlargement of the throat mentioned, and in known manner suppressing the objectionable loudness and altering the frequency of the issuing jet noise, without unduly decreasing the thrust of the jet. When thrust reversal is required, the bulbous sleeve is left in its position of maximum thrust, differing in this respect from the Lawler and Reinhart application, and a reversing louver arrangement is displaced to the rear of the jet nozzle, and intercepting vanes are disposed transversely of the jet nozzle, in position to direct intercepted gases outwardly and through the louver arrangement. Again, this differs from the Lawler et al. device, wherein the louver arrangement is immovable, and wherein the bulbous sleeve should be displaced from its maximum thrust position during thrust reversal. The present arrangement accomplishes thrust reversal without material loss of efficiency, and enables a reasonable degree of suppression of the noise.

The arrangement is such, in the preferred embodiment, that the noise suppressor elements, or divider vanes, can only be moved into their operative position, where they reduce the effective area of the throat, following movement of the bulbous plug to compensatingly enlarge the throat, being at other times retracted and covered, out of the jet stream. This insures that the thrust will not be materially reduced at times when the noise is being suppressed, which is while the aircraft is ground-borne, as in taxiing or taking off, or close to the ground, as in the first stages of flight.

This invention is particularly concerned with the compact arrangement of the above elements and the mechanism for accomplishing the shifting of the several parts in the manner and to the ends indicated above, and in particular concerns the relationship of certain such parts to others, whereby parts which may be shrouded or covered by other such parts when arranged for one condition, are uncovered and caused to move in conjunction with movement of the other part when different conditions prevail.

This invention is shown in a typical and illustrative form, somewhat diagrammatically, in the accompanying drawings, and it is not intended to be restricted in scope by this showing, nor by the description thereof, otherwise than as may be required by the claims.

Figure 1 is in general an axial sectional view, partly in elevation, of the rear end of a jet engine, illustrating parts in the cruise position, normal when the aircraft is at such altitudes that its noise would be unobjectionable, hence there is no attempt at silencing. Figure 2 is a partial rear elevation of the same.

Figure 3 is a view similar to Figure 1, omitting any elevational portion, but showing parts in the position for noise suppression, as for instance, during the take-off run, when substantially full thrust is desired but the noise level must be low, and Figure 4 is an end view similar to Figure 2, showing parts in the position corresponding to Figure 3.

Figure 5 is another view similar to Figure 3, but showing parts now in the reverse thrust position, as they would be following touchdown, and Figure 6 is an end view of the same, similar to Figure 4.

The jet engine includes a surrounding streamlined exterior cowl 9 of which only the rearmost end is shown, and interiorly thereof are spaced annular walls 90 and 91 which define an annular duct 92 for the rearward conduction of the gases of combustion, leading them to a tailpipe or jet orifice or nozzle 93. Somewhat forwardly of the open end of the tailpipe 93 the gases should pass through a convergent-divergent zone, including a restricted throat, for maximum thrust, in known manner, and the position and area of this throat may vary in accordance with different conditions of operation. For normal development of full power for cruising, the condition shown in Figure 1, the throat 99 should be of minimum area and located near the end of the tailpipe 93, and to accomplish this there is provided a bulbous sleeve 1, which surrounds a fixedly located center island 96, and fairs smoothly into the tailcone 95, at the rear end of the island. The largest diameter of the bulbous sleeve 1 cooperates with the outer wall extension 90a at the rear end of the tail pipe 93 to define the convergent portion 97, the restricted throat 99, and the divergent rearward enlargement thereof to the annular jet nozzle 94. Under other conditions, however, the throat 99a (see Figure 3) is located somewhat forwardly of the position of Figure 1, and this relocation of the throat is produced by a forward shift of the bulbous sleeve 1 axially into a position where its largest diameter cooperates in a somewhat different manner with the extension 90a of the inner wall of the duct 90, so that the convergent portion 97a and the divergent portion 94a of the gas passage, and the intervening throat 99a, are somewhat differently located and proportioned. Movement of the sleeve 1 between these two positions is accomplished under control of any suitable actuator 10, through suitable mechanism such as the collars and linkage mechanism which will be described in detail hereinafter.

The island 96 terminates rearwardly and externally of the tailpipe 93 in the tailcone 94, already mentioned, and in its rearward position (the position of Figure 1) the bulbous sleeve 1 constitutes in effect a smooth, forward continuation of the tailcone, so that the gases of the jet exiting from the annular jet nozzle 94 tend to follow the tailcone 95 and converge at its tip. This convergence into a single jet of large cross-section, however, gives rise to the loud and objectionable noise that sometimes appears characteristic of jet aircraft engines.

Silencing to the required degree is accomplished, according to the present invention, by gas stream divider vanes 2, which are shiftable between an inoperative position clear of the jet nozzle 94 or 94a and an operative position wherein they radiate transversely of that nozzle, spaced apart circumferentially. Conveniently, they are pivotally supported at 20 within the island 96 so that in their inoperative position they are submerged wholly within the island 96, and they are arranged to be closed in and the apertures through which they move are blocked off from the nozzle by the sleeve 1 in its rearmost position. When silencing is desired, the sleeve 1 is moved to its forward position, as shown in Figure 3 (which increases the effective throat area), and upon the sleeve 1 clearing the vanes 2, the latter may swing outwardly into their operative position wherein, as shown in Figure 4, they radiate at spaced intervals about the nozzle, and so divide the jet into numerous smaller jets and compensatingly reduce its effective area. These vanes, which may be of any suitable shape, as suggested in either of the Grotz et al. or the Lawler et al. applications mentioned above, and which are herein shown of V-shape and diverging rearwardly, occupy a part of the area of the jet nozzle, yet the total area should not be materially lessened while in flight near the ground. It is to avoid such restriction that the throat is enlarged, as represented at 99a, by shifting of the largest diameter of the bulbous sleeve forwardly from the cruise position. The total nozzle area remains about the same, as does the convergent-divergent shape of the throat.

The sleeve 1 and silencing vanes 2 operate conjointly, hence they can be arranged to be moved by a common actuator 10. To this end there are provided two collars, a first collar 11, which is secured to and moves axially with the rod 12 of the actuator 10, and second collar 21, which is telescopingly related to the collar 11 and rod 12, but which is spaced to the rear of the initial position of the collar 11. The collar 11 is connected to a quadrant or multiple bell crank lever 3 through linkage represented at 12, and the quadrant 3 is connected to the sleeve 1 at the point 31, through a link 30. Each silencing vane 2 is connected by a link 22 to bracket or spider 23, which radiates from the collar 21. It follows that when the actuator 10 is moved rearwardly under the influence of a pressure fluid applied to its left side, as viewed in Figure 1, for instance, the collar 11 immediately moves to the right, rotating the quadrant 3 through the linkage 13 and drawing the sleeve 1 to the left through the link 30. The vanes 2, however, do not move. Linkage 24, connecting the collar 21 and the quadrant 3, is for another purpose and is so arranged that rotation of the quadrant 3 in the clockwise direction will not effect any movement of the collar 21. However, when the collar 11 contacts the collar 21, after an initial amount of lost motion between them, the collar 21 is then moved to the right, and through the bracket or spider 23 and the link 22 effects rotation of each vane 2 about its pivot 20 into the outwardly radiated position shown in Figure 3. By this time, the sleeve 1 has been moved forwardly out of the way of the vanes 2 and the latter can move freely outwardly.

When the actuator 10 is moved in the reverse sense, that is, to the left, the quadrant 3, from the position of Figure 3, acts through the linkage 24 to draw the collar 21 to the left, and this movement, communicated to the vanes 2 again by the spider 23 and link 22, effects retractive movement of the vanes 2.

As will now be clear, it is possible to leave the vanes 2 retracted and the bulbous plug or sleeve 1 in its rearmost position where the best thrust is developed for cruising at altitudes, and when silencing is desired, it is possible by movement of the actuator 10 to draw the sleeve 1 forwardly so as to move the silencing vanes 2 outwardly, to modify the nozzle area compensatingly with relation to the restriction imposed by the vanes 2, and so with minimum loss of thrust to effect silencing.

Thrust reversal is required only after touching down. While silencing is still of importance, it is secondary to effective deceleration, for deceleration by thrust reversal requires only a short time, and the development of full thrust is highly desirable, although in the reverse sense. Maximum thrust is attained by leaving the bulbous sleeve 1 in its cruise position, without change in the throat area or location. Two instrumentalities are employed, according to the present invention, in reversal of thrust. These include thrust reversing vanes 4, which may in a typical form be of somewhat trough shape, which are normally in a retracted or inoperative position, but which can be moved into an outwardly radiating position to the rear of the jet nozzle 94, and an annularly arranged series of louvers 5 which lie externally of the tail pipe 93 and normally are shouded by the latter, but which can be moved rearwardly of the rear end of the tailpipe into a position where the individual louvers intercept and direct forwardly, around the rear end of the cowl 9, the gases which are intercepted and directed outwardly by the outwardly radiating interceptors or vanes 4. The position of parts for thrust reversal is shown in Figures 5 and 6. The thrust reversing elements themselves act to diminish sound levels, since they allow some gas to escape rearwardly between them, yet divide the jet into smaller jets, just as do the noise suppressor vanes 2.

Since it is desirable that the largest diameter of the sleeve 1 be left in its normal position near the rear end of the tail pipe 93 during thrust reversal, the thrust reversing devices are actuated independently of the actuator 10 and the silencing vanes 2 and sleeve 1. The thrust reversing vanes 4 are shown as pivotally mounted at 40 upon the tailcone 95 to the rear of the rearmost position of the sleeve 1. They are suitably connected to an actuator 41 within the tailcone, as for example, by a rod 42 and a link 43. Rearward movement (to the right) of the actuator 41 effects retraction of the thrust reverser vanes 4 and forward movement (to the left) as in Figure 5 effects their projection.

The louver sections 5, usually in the form of a hollow cylinder, are guided at 50 within the cowl 9 for forward and rearward movement, and this movement is effected by means of an actuator 51, connected to the louver sections by a rod 52 or in any other suitable manner. Movement of the actuator 51 to the right or rearwardly effects projection of the louver sections from their retracted or inoperative position into the operative position to the rear of the tail pipe 93. Opposite movement of the actuator 51 retracts the louver sections into their shrouded positions. It is convenient to connect the fluid pressure control to the actuators 41 and 51 for conjoint application of the pressure medium in a way to effect conjoint movement of the louver sections and thrust reversing interceptor vanes 4 into the operative position, and the reverse.

As will be seen in Figure 5, the projection of the intercepting vanes 4 into their radiating position intercepts in large measure the rearwardly directed gases from the nozzle 94, and the louvers 5 provide an outlet for them and direct them forwardly, thereby applying the thrust of the jet in reverse. When thrust reversal is no longer desired, the actuators 41 and 51 are shifted in the reverse senses to retract the vanes 4 and louver sections 5.

By the arrangement described, it will be seen that all necessary functions for silencing, for cruising without silencing, and for thrust reversal are concentrated at the tail end of the engine, and are incorporated as an integral part of the engine structure. The engine itself has no small, movable parts to be exposed to the jet stream nor to the relative air stream except that during thrust reversal the louvers 5 are so exposed. The operation of the various devices is controlled and effected in a simple manner.

I claim as my invention:

1. In a jet engine for aircraft, an annular outer duct wall flared outwardly and then inwardly to a rear nozzle for exit of the gas stream, an island coaxially disposed within said housing, a bulbous sleeve mounted upon and slidable axially relative to said island and having its portion of largest diameter spaced inwardly from the largest diameter of the duct wall, said sleeve cooperating with the duct wall to define a convergent-divergent annular gas duct with a throat of restricted area, said island being recessed beneath a first position of the sleeve, a plurality of stream dividers receivable within such recesses, and shiftable from an inoperative position therein, wherein they are clear of the gas stream, into an operative position wherein they are disposed at angularly spaced intervals about and transversely of the jet nozzle, to divide the gas stream into a number of smaller streams, means to shift said sleeve axially relative to the duct wall and to the recesses to uncover the recesses for movement of the dividers therefrom, and to shift and to alter the area of the throat compensatively with the restriction caused by the dividers in their operative positions, and actuator means operatively connected to each of the sleeve and the dividers, to effect such movement of each between the respective positions.

2. The combination of claim 1, wherein a single actuator is operatively connected to the sleeve to shift the same from its first position, and to the dividers to shift the latter to their operative position after such shifting of the sleeve.

3. The combination of claim 2, wherein the actuator is directly operatively connected to the sleeve, and including lost-motion mechanism interposed between the actuator and the dividers, for initial movement of the sleeve to a second position, clear of the divider recesses, prior to movement of the dividers from their recesses into their operative positions.

4. In combination with the tail pipe of a jet aircraft engine, formed with an interior duct wall diverging rearwardly and then converging, and an island with a tailcone coaxially disposed within said tail pipe, a bulbous sleeve surrounding said island and supported for axial movement between a rearmost position wherein the sleeve's portion of largest diameter is adjacent but spaced from the rear convergence of the tail pipe's wall to define a restricted normal convergent-divergent jet nozzle discharging rearwardly, and a foremost position wherein the sleeve's portion of largest diameter is more nearly in registry with the duct wall's portion of largest diameter to define a forwardly displaced convergent-divergent jet nozzle of larger throat area, silencing vanes supported for movement from a radially directed operative position, rearwardly of the sleeve when the latter is in its foremost position, and extending substantially to the rear edge of the tail pipe, into a retracted position clear of the jet nozzle, and a common means operatively connected to the sleeve and to the silencing vanes for shifting the latter conjointly from the rearmost to the foremost position, and from the retracted to the operative position, respectively.

5. The combination of claim 4, wherein the silencing vanes in their retracted position are disposed beneath the sleeve in its rearmost position, the shifting means including a lost-motion device whereby to initiate shifting of the vanes following shifting of the sleeve out of the path of said vanes.

6. The combination of claim 4, including thrust-reversing vanes supported from the tailcone, to the rear of the sleeve's rearmost position and movable outwardly from the tailcone from a retracted position into radially directed intercepting positions transversely of the jet nozzle, thrust reversing louver means shiftable rearwardly from an inoperative position wherein they are shrouded by the tail pipe into an operative position to the rear of said tail pipe and into the vicinity of the outer ends of the intercepting vanes, and means for shifting the intercepting vanes from their retracted positions into their intercepting positions, and the louver means from their shrouded inoperative position into their operative position.

7. In combination with the tail pipe and the island and tailcone of a jet engine for aircraft, together defining an annular jet nozzle, a bulbous sleeve supported upon said island for axial movement, and in its rearmost position constituting a forward continuation of the tailcone, jet intercepting thrust reversing vanes supported by the tailcone rearwardly of said bulbous sleeve and movable outwardly from the tailcone into radially directed intercepting positions transversely of the annular jet orifice, thrust reversing louver means shiftable rearwardly from an inoperative position wherein they are shrouded by the tail pipe into an operative position to the rear of said tail pipe and into the vicinity of the outer ends of the intercepting vanes, silencing vanes supported upon the island, within the rearmost position of the bulbous sleeve, for movement outwardly into radially directed silencing positions, transversely of the annular jet orifice, means interconnecting the bulbous sleeve and the silencing vanes for shifting of said sleeve forwardly to uncover the vanes, and for shifting of the uncovered silencing vanes outwardly into silencing position, and separate means for shifting the thrust reversing vanes and louver means into their outward and rearward positions, respectively.

8. The combination of claim 7, wherein the shifting means includes a first and a second collar telescopingly related, an actuator connected to shift the first collar, linkage means connecting the first collar to the sleeve for forward shifting of the sleeve with initial movement of the first collar, further linkage means connecting the second collar with the silencing vanes for outward swinging of said vanes upon engagement of the second collar by the first and continuing conjoint movement of said collars.

9. The combination of claim 8, including an interconnection between the two linkage means for reversely shifting the second collar to retract the vanes, following initial reverse shifting of the second collar, and further conjoint reverse movement of said collars.

References Cited in the file of this patent
UNITED STATES PATENTS

| | | |
|---|---|---|
| 2,797,548 | Marchal et al. | July 2, 1957 |
| 2,845,775 | Tyler et al. | Aug. 5, 1958 |